US008860734B2

(12) United States Patent
Sieka

(10) Patent No.: US 8,860,734 B2
(45) Date of Patent: Oct. 14, 2014

(54) WAGERING GAME OBJECT ANIMATION

(75) Inventor: Mark T. Sieka, Frankfort, IL (US)

(73) Assignee: WMS Gaming, Inc., Waukegan, IL (US)

( * ) Notice: Subject to any disclaimer, the term of this patent is extended or adjusted under 35 U.S.C. 154(b) by 749 days.

(21) Appl. No.: 13/106,398

(22) Filed: May 12, 2011

(65) Prior Publication Data

US 2011/0281628 A1 Nov. 17, 2011

Related U.S. Application Data

(60) Provisional application No. 61/333,835, filed on May 12, 2010.

(51) Int. Cl.
*G06T 13/40* (2011.01)
*G07F 17/32* (2006.01)

(52) U.S. Cl.
CPC ........ *G07F 17/3227* (2013.01); *G07F 17/3211* (2013.01)
USPC ................................ 345/473; 463/12; 463/22

(58) Field of Classification Search
CPC ......... G06T 13/00; G06T 13/80; G06T 13/40; A63F 9/24; A63F 9/0468; A63F 3/00157; A63F 1/00; A63F 9/04; A63F 2001/0425; A63F 3/0605; A63F 5/00; A63F 9/0402; G07F 17/32; G07C 15/006
USPC .............. 463/16, 25, 43; 436/12, 22; 345/473
See application file for complete search history.

(56) References Cited

U.S. PATENT DOCUMENTS

| | | | |
|---|---|---|---|
| 5,692,117 | A | 11/1997 | Berend et al. |
| 5,929,867 | A | 7/1999 | Herbstman et al. |
| 6,866,585 | B2 | 3/2005 | Muir |
| 7,112,133 | B2 | 9/2006 | Lyons |
| 7,184,100 | B1 | 2/2007 | Wilf et al. |
| 7,262,775 | B2 | 8/2007 | Calkins et al. |
| 2006/0232589 | A1 | 10/2006 | Glein |
| 2006/0267978 | A1 | 11/2006 | Litke et al. |
| 2009/0309881 | A1 | 12/2009 | Zhao et al. |

OTHER PUBLICATIONS

Sun, Jian "Bi-directional Tracking using Trajectory Segment Analysis", *Computer Vision, 2005. ICCV 2005. Tenth IEEE International Conference*, Oct. 17, 2005, 8 pages.

*Primary Examiner* — Ke Xiao
*Assistant Examiner* — Sarah Le
(74) *Attorney, Agent, or Firm* — DeLizio Gilliam, PLLC

(57) ABSTRACT

An outcome of a dice throw and an orientation of the dice can be randomly determined. Based on knowledge of the outcome of the dice throw and the orientation of the dice, die faces that face the player at a beginning time instant of the animated motion can be back calculated. The dice can then be accordingly constrained to a selected one of a number of predefined animations for the dice to efficiently generate a more realistic and accurate graphical representation of the dice throw on the wagering game machine. Such a technique for generating the graphical representation of the dice throw based on 3D modeling and physics of the dice throw precludes managing and maintaining texture maps. Also, the graphical representation of the dice throw can be presented without texture swapping and with less computation because the pre-modeled dice are constrained to the selected animation of the dice.

21 Claims, 6 Drawing Sheets

WAGERING GAME OBJECT ANIMATION

RELATED APPLICATIONS

This application claims the priority benefit of U.S. Provisional Application Ser. No. 61/333,835 filed May 12, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to presenting three-dimensional (3D) effects on wagering game machines.

BACKGROUND

Wagering game systems employ various techniques to present graphical representations of a wagering game on a wagering game machine display unit. For example, a sequence of images may be stored in memory and may be presented on the wagering game machine display unit. As another example, three-dimensional animations may be pre-rendered into and may be stored as two-dimensional animations. The stored images and animations may be played back in response to a player input. As yet another example, the three-dimensional animations may be generated in real-time (e.g., on detecting player input). The employed techniques influence the quality of the graphical representations of the wagering game presented on the wagering game machine display unit and the computational load.

BRIEF DESCRIPTION OF THE FIGURES

Embodiments of the invention are illustrated in the Figures of the accompanying drawings in which.

DESCRIPTION OF THE EMBODIMENTS

Figure 1:
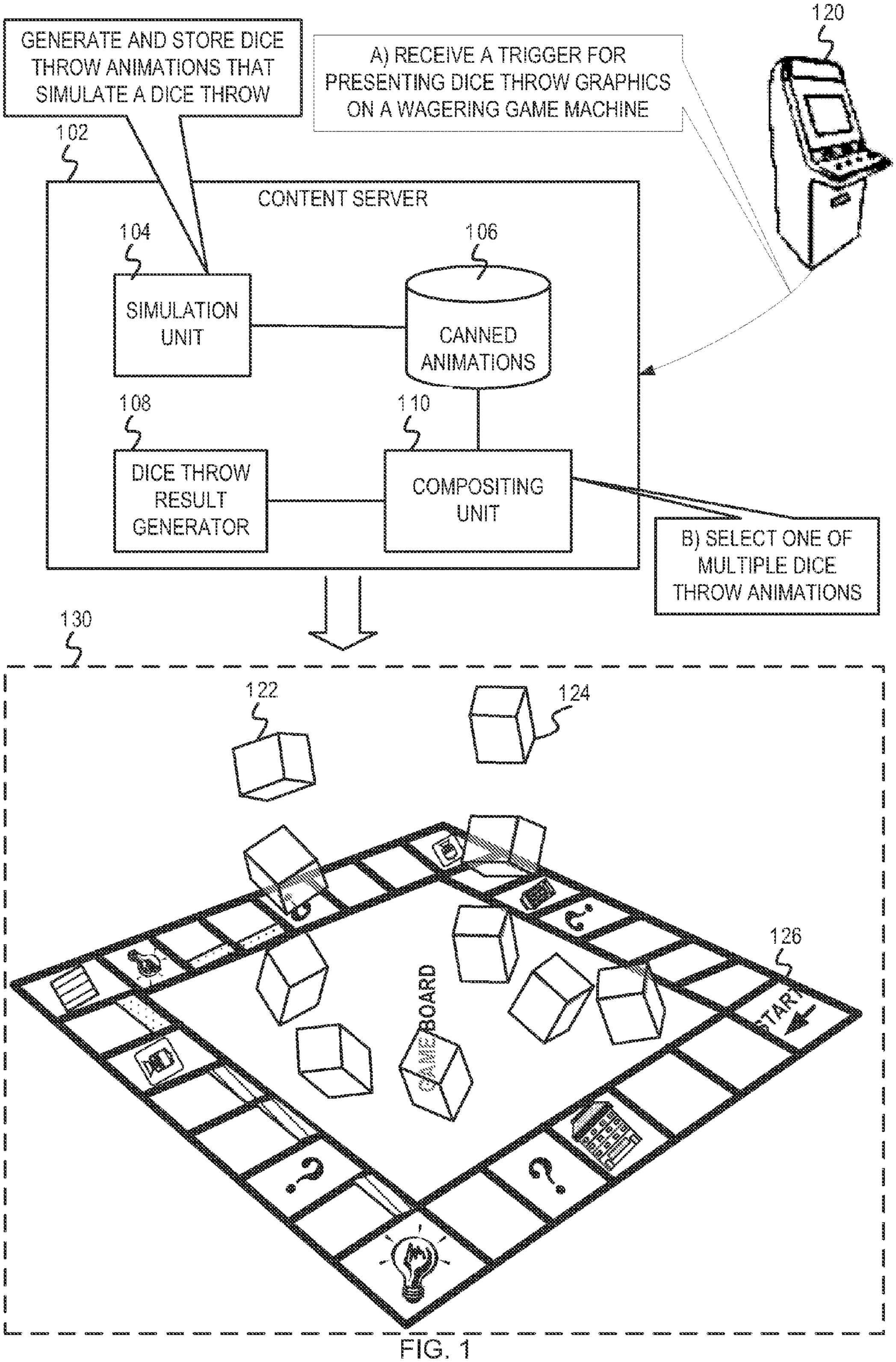
FIG. 1 depicts a conceptual diagram illustrating example operations for presenting a three-dimensional representation of a dice throw on a wagering game machine.

The description that follows includes example systems, methods, techniques, instruction sequences, and computer program products that embody techniques of the present inventive subject matter. However, it is understood that the described embodiments may be practiced without these specific details. For instance, although examples refer to animating a dice throw based on dice throw animations and 3D modeling of the dice, embodiments are not so limited. For instance, generating graphical representations based on previously generated animations and 3D models of objects as described herein may be extended to other gaming scenarios (e.g., scenarios involving coin flipping, a spinning roulette wheel, etc.). In other instances, well-known instruction instances, protocols, structures, and techniques have not been shown in detail in order not to obfuscate the description A graphical representation of a dice throw is typically presented on a wagering game machine using texture mapping and texture swapping. Texture mapping involves adding texture (e.g., an image, color, lighting, etc.) to a three-dimensional object (e.g., a die). Texture swapping involves swapping a sequence of texture maps in succession to generate an illusion of movement of the object and other such effects (e.g., shadow effects). Existing techniques for graphically representing a dice throw on a wagering game machine typically involve swapping out an initial texture map with a texture map that corresponds to an outcome (e.g., in this case texture maps that represent die faces) applied to a three-dimensional die model of an animation. The animation simulates movement of the die, rotation of the die through space, and other such effects. For example, to depict movement of the die, a first texture map is applied to the three-dimensional model of the die at a beginning frame of an animation. At an intermediate frame of the animation, the first texture map is swapped for a second texture map that corresponds to the outcome. Implementing texture swapping can be computationally intensive because it involves determining which textures to display, how to vary the textures to depict movement of and interactions between dice, etc., as well as storing and accessing multiple texture maps for a same animation.

Animating motion of dice as a result of a dice throw can be implemented based on a simulation of physics of the dice throw (e.g., dynamics of rigid body interactions in three dimensions, effects of gravity, etc.). An outcome of the dice throw (e.g., top die faces) and an orientation of the dice (e.g., which die faces face a player) can be randomly determined (e.g., by a random number generator). Based on knowledge of the outcome of the dice throw and the orientation of the dice, die faces that face the player at a beginning time instant of the animated motion (e.g., a first frame of the animated motion) can be back calculated. The dice (that are pre-modeled and have values on each of their faces) can then be accordingly constrained to a selected one of a number of predefined animations for the dice to efficiently generate a more realistic and accurate graphical representation of the dice throw on the wagering game machine. Such a technique for generating the graphical representation of the dice throw based on 3D modeling and physics of the dice throw precludes managing and maintaining texture maps. Also, the graphical representation of the dice throw can be presented without texture swapping and with less computation because the pre-modeled dice are constrained to the selected animation of the dice.

Figure 2:
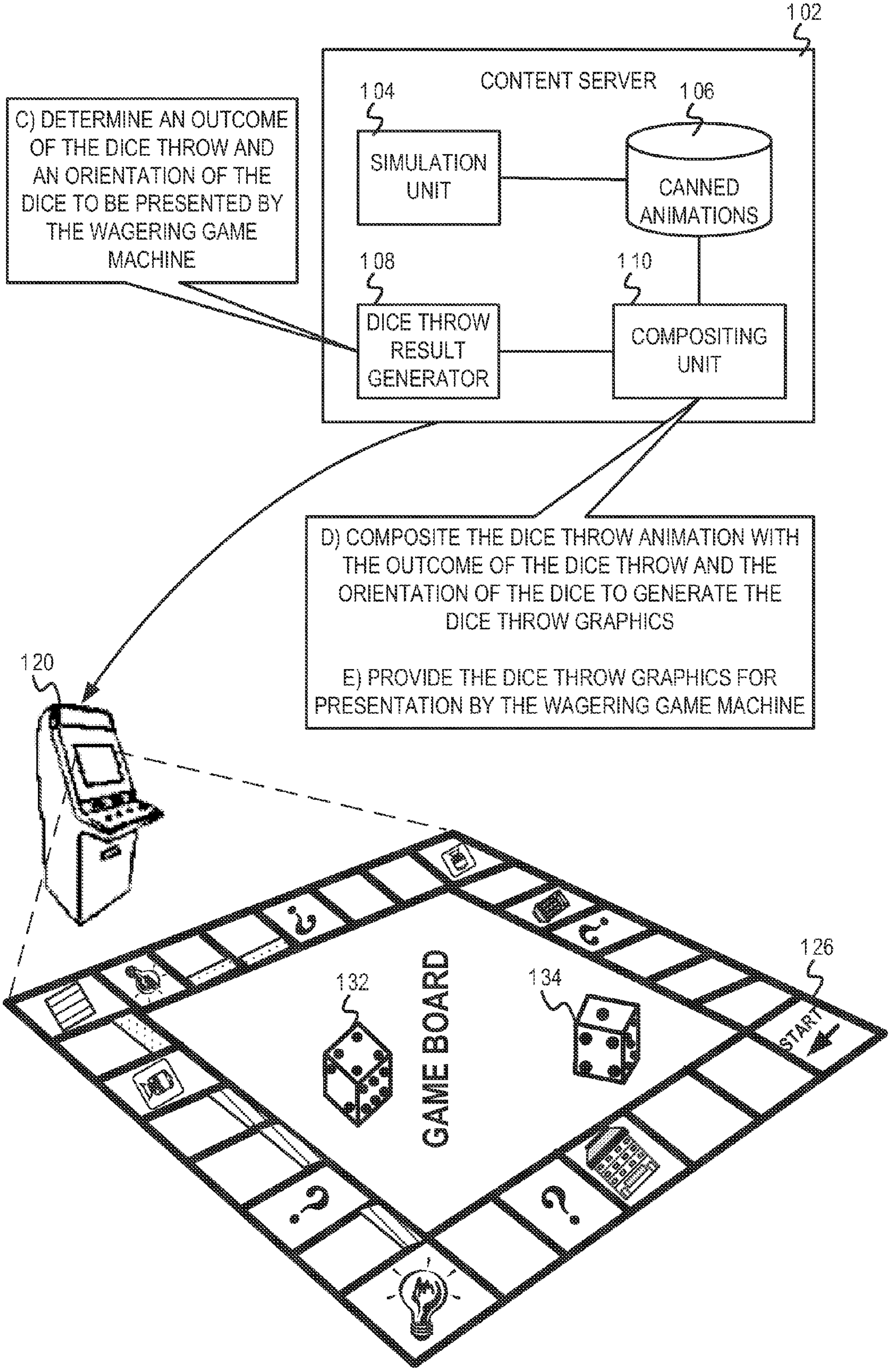
FIG. 2 depicts the conceptual diagram illustrating example operations for presenting the three-dimensional representation of the dice throw on the wagering game machine.

FIG. 1 and FIG. 2 depict a conceptual diagram illustrating example operations for presenting a three-dimensional representation of a dice throw on a wagering game machine. FIG. 1 depicts a content server 102 and a wagering game machine 120. The content server 102 comprises a simulation unit 104, a canned animations database 106, a dice throw result generator 108, and a compositing unit 110. The simulation unit 104 is coupled with the canned animations database 106. The compositing unit no is coupled with the canned animations database 106 and with the dice throw result generator 108. The wagering game machine 120 is also communicatively coupled with the content server 102.

The simulation unit 104 generates and stores dice throw animations that simulate a dice throw. For this, the simulation unit 104 runs a dynamic simulation of the dice throw. The simulation unit 104 can comprise a predetermined set of rules and models that describe the motion of one or more dice subject to various laws of nature and laws of physics. The simulation unit 104 can be configured to appropriately constrain and model the motion of the dice based on properties of the dice and properties of other objects with which the dice interact. For example, the simulation unit 104 can model the motion of the dice based on dynamics of rigid bodies in three dimensions if both the dice and the table on which the dice come to rest are rigid objects (i.e., objects that undergo no perceptible deformation on collision). Additionally, the simulation unit 104 can simulate the motion of the dice, interaction between the dice, and interaction between the dice and the game board based on various initial parameters associated with the dice throw. The initial parameters associated with the dice throw can include: a direction of the dice throw (e.g., whether the dice are thrown upwards or towards a game board); whether or not to display a dice throwing hand, the table, and other background objects; how high the dice should be thrown (e.g., a force with which a player should throw the dice); whether the dice should collide in mid-air and/or on the game board; at what height from the game board or at what position on the game board the dice should collide; etc. The simulation unit 104 can comprise a physics engine (e.g., a Havok Physics™ engine) that enables dynamic simulation of the dice throw subject to the above-mentioned constraints.

A human operator (e.g., a programmer) may analyze simulation results generated by the simulation unit 104 to ensure that the simulation results present, to the player, a realistic and believable representation of the dice throw. Parameters of the simulation unit 104 may be adjusted and the dynamic simulation of the dice throw may be executed multiple times to ensure that the simulation results generated by the simulation unit 104 are realistic and accurate. For example, if the dice come to rest too quickly after impact with the game board, a coefficient of friction of the game board may be adjusted so that the dice slide along the game board before coming to a halt.

The simulation results can then be converted (e.g., by the simulation unit 104) into a sequence of key frames to generate a dice throw animation. A key frame is one of a sequence of frames that constitute and define the dice throw animation. The key frames in the dice throw animation define pivotal states of the dice during the dice throw animation. For example, for the dice throw animation, key frames may be generated at least for A) the dice at the instant when the dice are released from a throwing hand, B) the dice at their highest point from the game board, C) collision of the dice in mid-air, D) the dice after the collision in mid-air, and E) the dice after impact with the game board, etc. The sequence of the key frames in the dice throw animation defines movement of the dice that the player will see, while the position of the key frames in the dice throw animation defines timing of the movement (i.e., when the key frame will be seen by the player).

The dice throw animation generated based on the simulation results mimic the motion of the dice as determined by the dynamic simulation of the dice throw. Various animation software (e.g., Autodesk® Maya animation software) can be used to generate the dice throw animation from the simulation results. For example, the Autodesk Maya animation software allows the programmer to automatically create, from the simulation results, a set of key frames that mimic the dynamic motion of the dice throw. Depending on the degree of precision and quality of the desired animation, the programmer can choose to convert each frame of the simulation results into a key frame or to reduce the number of key frames generated (e.g. by manually deleting frames that the programmer thinks can safely be removed without affecting quality of the dice throw animation, by configuring the animation software to generate a fewer number of key frames, etc.). When the dice throw animation is executed, the dice throw animation transitions between each of the specified key frames. Various interpolation techniques (e.g., spline interpolation) can be implemented to determine how to transition from one key frame to a next key frame.

The dice throw animation, once generated, depicts the dice in the dice throw animation as dice simulation cubes. FIG. 1 depicts an example dice throw animation 130 comprising a game board 126 and two dice simulation cubes 122 and 124. It is noted that in FIG. 1, the dice throw animation 130 depicts a superposition of multiple key frames and different positions of the dice simulation cubes 122 and 124 for the duration of the dice throw animation 130. Typically, each key frame will depict a single position for each of the dice simulation cubes 122 and 124 at a pre-defined point in time. The dice simulation cubes 122 and 124 are faceless and do not depict values on die faces (e.g., dots, numbers, or other graphical images on the die faces). The dice simulation cubes 122 and 124 are substitutes for the dice and have the same physical characteristics of the dice e.g., a rigid 6-sided structure with dimensions equal to the dimensions of the dice to be displayed on a display unit of the wagering game machine 120). In some implementations, as depicted in FIG. 1, the dice throw animation 130 may depict other background elements (e.g., the game board 126, a table, background color, images, animation, etc.). In other implementations, however, the dice throw animation 130 generated using the dice simulation cubes 122 and 124 may only comprise movement and interaction of the dice simulation cubes 122 and 124 with each other; and the other background elements may be superposed or composited before/during presentation. The dice throw animation 130 can be stored for future use in the canned animations database 106. Pre-modeled dice can be constrained to the dice simulation cubes 122 and 124 in the dice throw animation 130. The pre-modeled dice become children of the simulation cubes and inherit the animation from the parent geometry (i.e., geometry of the dice simulation cubes) to present a graphical representation of the dice throw ("dice throw graphics" as will be described by stages A-B in FIG. 1 and stages C-E in FIG. 2.

At stage A, the content server 102 receives a trigger for presenting dice throw graphics on the wagering game machine 120. The dice throw graphics comprise an animation depicting throwing of one or more dice (two dice in the example of FIG. 1) and motion of the dice after the dice are thrown to determine an outcome of the dice throw. The trigger for presenting the dice throw graphics may be generated responsive to a player selecting a "roll dice" graphical user interface (GUI) object, shaking a gaming device, swiping their hand across a screen of a gaming device, etc.

At stage B, the compositing unit no selects one of multiple dice throw animations from the canned animations database 106 to generate the dice throw graphics. In FIG. 1, the compositing unit no selects the dice throw animation 130 from the canned animations database 106. The compositing unit 110 may select the dice throw animation 130 at random or may select the dice throw animation 130 based on knowledge of previously selected dice throw animations. For example, the compositing unit 110 may not select any of N previously selected dice throw animations so that the player does not get the impression that the same set of dice throw animations are being reused. This may be desirable to enhance the believability of the dice throw graphics presented by the wagering game machine 120.

At stage C FIG. 2, the dice throw result generator 108 determines an outcome of the dice throw and an orientation of the dice to be presented by the wagering game machine 120. After the dice are thrown, the outcome of the dice throw is represented by top faces of the dice and is used to further a wagering game being played. For example, the outcome of the dice throw may be used to determine a number of blocks that the player moves on the game board 126. The dice throw result generator 108 can comprise a random number generator that randomly determines the outcome of the dice throw, thus eliminating potential bias in determining the outcome of the dice throw. In FIG. 2, the outcome of the dice throw is "4" for die 132 and "1" for die 134. In other words, a top face of the die 132 displays a value of "4" and a top face of the dice 134 displays a value of "1".

Additionally, the dice throw result generator 108 also determines the orientation of the dice. The orientation of the dice represents values on vertical faces of a die ("vertical die faces") that are depicted or are "visible" to the player. In some implementations, the orientation of the dice may be determined at random (e.g., based on the random number generator selecting values for the each of the vertical die faces that face the player). The random number generator may be appropriately constrained so that the values on the vertical die faces are different from the value selected as the outcome of the dice throw (i.e., the value on the top face). In some implementations, the dice throw result generator 108 may be configured so as not to consecutively select the same orientation for any given die. For example, the dice throw result generator 108 may be configured so that after a first orientation of the die 132 is selected, the first orientation of the die 132 is not selected for at least M subsequent dice throws. In FIG. 2, the die 132 is oriented such that vertical die faces with values "2" and "6" face the player. The die 134 is oriented such that vertical die faces with values "4" and "5" face the player. In some implementations, the position of the vertical die faces may also be determined while determining the orientation of the dice. For example, the dice throw result generator 108 may determine that a left vertical die face of the die 132 should display "2" while the right vertical die face of the die 132 should display "6".

At stage D, the compositing unit 110 composites the dice throw animation (selected at stage A) with the outcome of the dice throw and the orientation of the dice (determined at stage C) to generate the dice throw graphics. The outcome of the dice throw and the orientation of the dice represent a final state of the dice (i.e., the dice as presented on the wagering game machine 120 once the dice come to a stop). Based on knowledge of the outcome of the dice throw and the orientation of the dice, previous states of the dice can be back calculated to determine values of the die faces that are positioned in the direction of the player at any given point of time. The compositing unit 110 can back calculate, based on the outcome of the dice throw and the orientation of the dice, to determine an initial state of the dice. The initial state of the dice represents values of one or more of the faces that face the player at a first key frame of the dice throw animation. In addition to the outcome of the dice throw and the orientation of the dice, the initial state of the dice can also be determined based on knowledge of the dice throw animation (e.g., the motion of the dice between the first key frame and a last key frame). For example, assuming that the motion of the die 132 is defined by the motion of the dice simulation cube 122 of FIG. 1, the values of die faces that initially face the player may be determined to be "2" on a left vertical die face, "6" on a right vertical die face, and "3" on a bottom die face.

The compositing unit 110 can then constrain the dice 132 and 134 to the respective dice simulation cubes 122 and 124. The dice 132 and 134 are typically pre-modeled and comprise predetermined values on each face of the dice 132 and 134. In constraining the dice 132 and 134 to the respective dice simulation cubes 122 and 124, the die 132 inherits properties and motion of the dice simulation cube 122, while the die 134 inherits properties and motion of the dice simulation cube 124. The dice 132 and 134 are constrained to the dice simulation cubes 122 and 124 respectively, so that the values of the die faces at the first key frame are in accordance with the initial state of the dice. In one implementation, vertices of the dice 132 and 134 may be appropriately constrained to vertices of the respective dice simulation cubes 122 and 124. In another implementation, the dice 132 and 134 may be appropriately constrained to the respective dice simulation cubes 122 and 124 so that normal vectors of the dice 132 and 134 (i.e., vectors perpendicular to each face of the dice) are aligned with normal vectors of the respective dice simulation cubes 122 and 124. Thus, as the vectors of the dice simulation cubes 122 and 124 change (e.g., because of rotational motion, translation motion, etc. described by the dice throw animation), the vectors of the dice 132 and 134 change accordingly, giving the player the illusion that the dice 132 and 134 are moving. The dice throw animation 130 with the dice 132 and 134 constrained to the respective simulation dice cubes 122 and 124 in accordance with the initial state of the dice constitute the dice throw graphics.

At stage E, the corn positing unit 110 provides the dice throw graphics for presentation by the wagering game machine 120. A presentation unit (not shown) on the wagering game ma chine 120 can execute and present the dice throw graphics on a display unit of the wagering game machine 120 to present the outcome of dice throw and the orientation of the dice (as determined at stage C).

It is noted that although FIGS. 1-2 describe the content server 102 providing the dice throw graphics (after appropriately constraining the dice 132 and 134 to the respective dice simulation cubes 122 and 124), embodiments are not so limited. In some implementations, the compositing unit 110 may be embodied as part of the wagering game machine 120. The compositing unit on the wagering game machine 120 can receive an indication of the selected dice throw animation, the outcome of the dice throw, and the orientation of the dice. The compositing unit on the wagering game machine 120 may determine the initial state of the dice, may appropriately constrain the dice 132 and 134 to the respective dice simulation cubes 122 and 124 to generate the dice throw graphics, and may present the dice throw graphics on the display unit of the wagering game machine 120. In addition, embodiments are not limited to embodying a simulation unit, canned animations database, compositing unit, and dice throw result generator on a same content server. The functionality of these depicted units can be performed across a various machines in various combinations. For instance, a machine distinct from a content server can determine a result of a dice thrown and a database separate from a content server can store dice throw animations.

Example Operations

This section describes operations associated with some embodiments of the inventive subject matter. In the discussion below, the flow diagrams will be described with reference to the block diagrams presented above. However, in some embodiments, the operations can be performed by logic not described in the block diagrams. In certain embodiments, the operations can be performed by executing instructions residing on machine-readable storage media (e.g., software residing in memory or on an optical disk), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
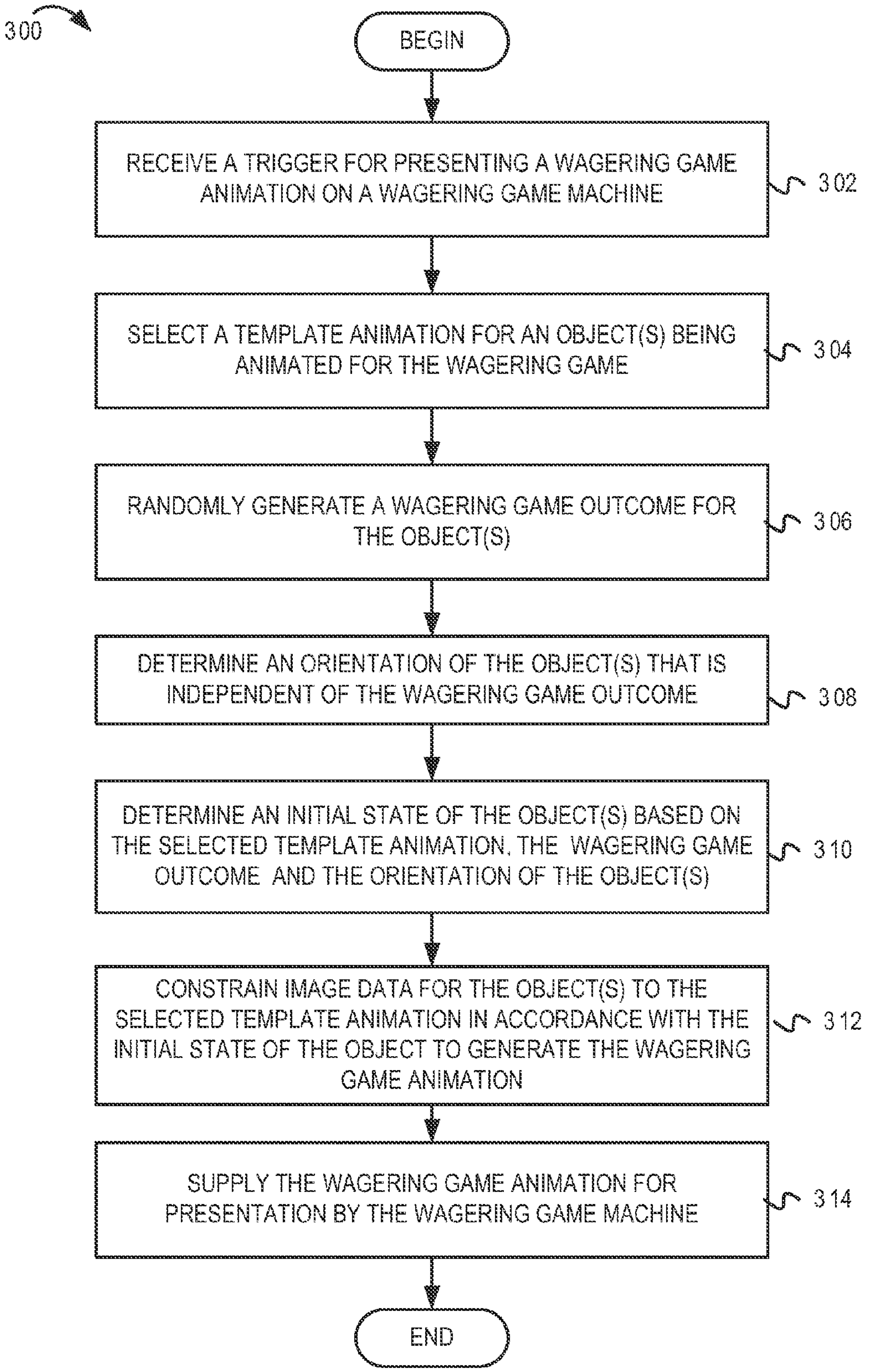
FIG. 3 is a flow diagram illustrating example operations for generating wagering game animation on a wagering game machine.

FIG. 3 is a flow diagram illustrating example operations for generating wagering game animation on a wagering game machine. Flow 300 begins at block 302.

At block 302, a trigger for presenting a wagering game animation on wagering game machine is received. For instance, a trigger for presenting a dice throw animation on a wagering game machine is received. The trigger for presenting the dice throw animation may be received from the wagering game machine and may be received responsive to a player input. For example, the trigger for presenting the dice throw animation may be generated responsive to the player clicking on a "roll dice" GUI object. The trigger for presenting the dice throw animation may be automatically generated responsive to occurrence of wagering game events. For example, the trigger for presenting the dice throw animation may be generated on determining that it is the player's turn to roll the dice. The trigger for presenting the dice throw animation may be generated automatically in response to inactivity of the player. For example, the trigger for presenting the dice throw animation may be generated in response to determining that it is the player's turn to roll the dice and that the player has been idle for X minutes. The flow continues at block 304.

At block 304, a template animation for an object(s) being animated for the wagering game is selected. Me object(s) can be one or more dice, a ball, a coin, etc. For instance, a dice throw animation that simulates a dice throw is selected. The dice throw animation comprises a sequence of key frames that define positions of the dice at different points of time for the duration of the key frame animation. The position of the key frames in the dice throw animation indicates when the player will view the key frames. The dice throw animation can comprise any suitable number of key frames. For example, the dice throw animation can comprise key frames that depict the dice at a starting position (e.g., after the dice are thrown), the dice at one or more intermediate positions (e.g., the dice before and after impact with another object), and the dice at an end position (e.g., after the dice come to rest on a game board). The dice throw animation that simulates the dice throw may be selected from a predetermined set of canned dice throw animations. The predetermined set of canned dice throw animations may be generated by the operations that be described in FIG. 4. The flow continues at block 306.

At block 306, a wagering game outcome for the object(s) is randomly generated. A random number generator generates a value that corresponds to a particular wagering game (e.g., heads or tails for a coin flip, a colored number in roulette, lottery numbers, etc.). For instance, an outcome of a dice throw is randomly generated. The outcome of the dice throw is randomly generated to guard against the possibility of bias in determining the outcome of the dice throw. Generating the outcome of the dice throw involves determining a value of a top face of each die in the dice throw animation. Referring to the two dice example of FIG. 2, it may be determined that the top face of the die 132 and the top face of the die 134 should display "4" and "1" respectively. A random number generated by a random number generator may be used to determine the outcome of the dice throw. In some implementations, the random number generator may be a true random number generator based on a random atomic or subatomic physical phenomenon (e.g., radioactive decay, thermal noise, etc.). In other implementations, a pseudo random number generator may be used to generate the outcome of the dice throw. To determine the outcome of a single die throw, the random number generator may generate a number between 1 and 6. The flow continues at block 308.

At block 308, an orientation, which is independent of the wagering game outcome, of the object(s) is determined. For example, an orientation of dice is determined. Determining the orientation of the dice involves determining which values are to be displayed on vertical die faces that face the player, once the dice come to rest on the game board. In some implementations, the orientation of the dice may be randomly determined (e.g., by the random number generator). For example, based on knowledge of the value on the top face of a die, the random number generator can be constrained to randomly select values for vertical die faces that face the player. In other implementations, the orientation of the dice may not be randomly selected. Instead, the orientation of the dice may be selected based on knowledge of an orientation of the dice in a preceding dice throw. The orientation of the dice may be selected so that the selected orientation of the dice is different from the orientation of the dice in the preceding dice throw. In some cases, the object may not have an orientation (e.g., a uniformly colored sphere), and an operation(s) to implement block 308 is not performed. In some cases, the orientation corresponds to the wagering game outcome. The flow continues at block 310.

At block 310, an initial state of the object(s) is determined based on the selected template animation, the wagering game outcome, and the orientation of the object(s). For instance, an initial state of dice is determined based on a selected dice throw animation, an outcome of the dice throw, and an orientation of the dice. The initial state of the dice represents the values of the die faces (that face the player) at a first key frame of the dice throw animation. The initial state of the dice can be determined by back calculating from a last state of the dice (i.e., the outcome of the dice throw determined at block 306 and the orientation of the dice determined at block 308) through each key frame of the dice throw animation. The dice that are eventually presented as part of the dice throw graphics are pre-modeled. Therefore, values of the die faces that are adjacent to and opposite each other are predetermined and fixed. In other words, if a die is pre-modeled such that a die face with value "one" is opposite a die face with value "six", the position of the die faces with values "one" and "six" will not vary, with respect to each other, from one die throw to another die throw.

Based on knowledge of the position (on a die) of each die face with respect to other die faces, values on die faces that face the player at each key frame of the dice throw animation can be back calculated. For example, in FIG. 2, it is determined that the value on the top face of the die 134 is "1" and that the orientation of the die 134 is such that vertical die faces with values "4." and "5" are positioned in the direction of the player. Assuming that the motion of the die 134 is constrained by the motion of the dice simulation cube 124 of FIG. 1, the values of die faces that face the player in the first key frame can be determined. For example, it can be determined that the die faces with values "4", "2", and "6" should be presented as an initial state of the top, left vertical, and right vertical faces of the die 134. After the initial state of the dice is determined, the flow continues at block 312.

At block 312, image data for the object(s) is constrained to the selected template animation in accordance with the initial state of the object to generate the wagering game animation. Image data can comprise geometric data (e.g., vertices, edges, etc.) for rendering the object(s). Image data can also comprise other data for rendering colors, lighting, etc. Geometric data for a roulette ball can be attached to a model ball of a template roulette ball animation for a roulette wheel based on the final resting spot of the ball, the template animation, and the start position of the ball. Image data for a lately ball can be attached to a model lottery ball animation. Dice can be attached to a dice throw animation in accordance with the initial state of the dice. As described above, the dice throw animation comprises model cubes (dice simulation cubes) that simulate dice in the dice throw animation. After the initial state of the dice is determined, the dice can be constrained to the dice simulation cubes in the dice throw animation so that the dice inherit the animation of the dice simulation cubes. Consequently, as depicted in FIG. 2, the dice throw animation 130 now depicts the dice 132 and 134 instead of faceless dice simulation cubes 122 and 124. The dice 132 and 134 however, inherit the motion (depicted in FIG. 1) of the dice simulation cubes 122 and 124 respectively. The dice can be constrained to the dice simulation cubes to reflect the calculated initial state of the dice (determined at block 310). Various techniques can be implemented to constrain the dice to the dice simulation cubes (e.g., vertices of the dice may be constrained to vertices of the dice simulation cubes). Although the examples repeatedly refer to dice for explanatory purposes, embodiments can employ different cube simulations for dice in different wagering games (e.g., craps, a board styled game, etc.). The flow continues at block 314.

At block 314, the wagering game animation is supplied for presentation by the wagering game. For example, a dice throw animation is provided for presentation by the wagering game machine. In addition to providing the dice throw animation, additional information (e.g., instructions for generating sound, lighting effects, motion of the wagering game machine and/or other structures, etc.) may also be provided. For instance, sound data may be predetermined for each of the available template animations. From block 314, the flow ends.

Figure 4:
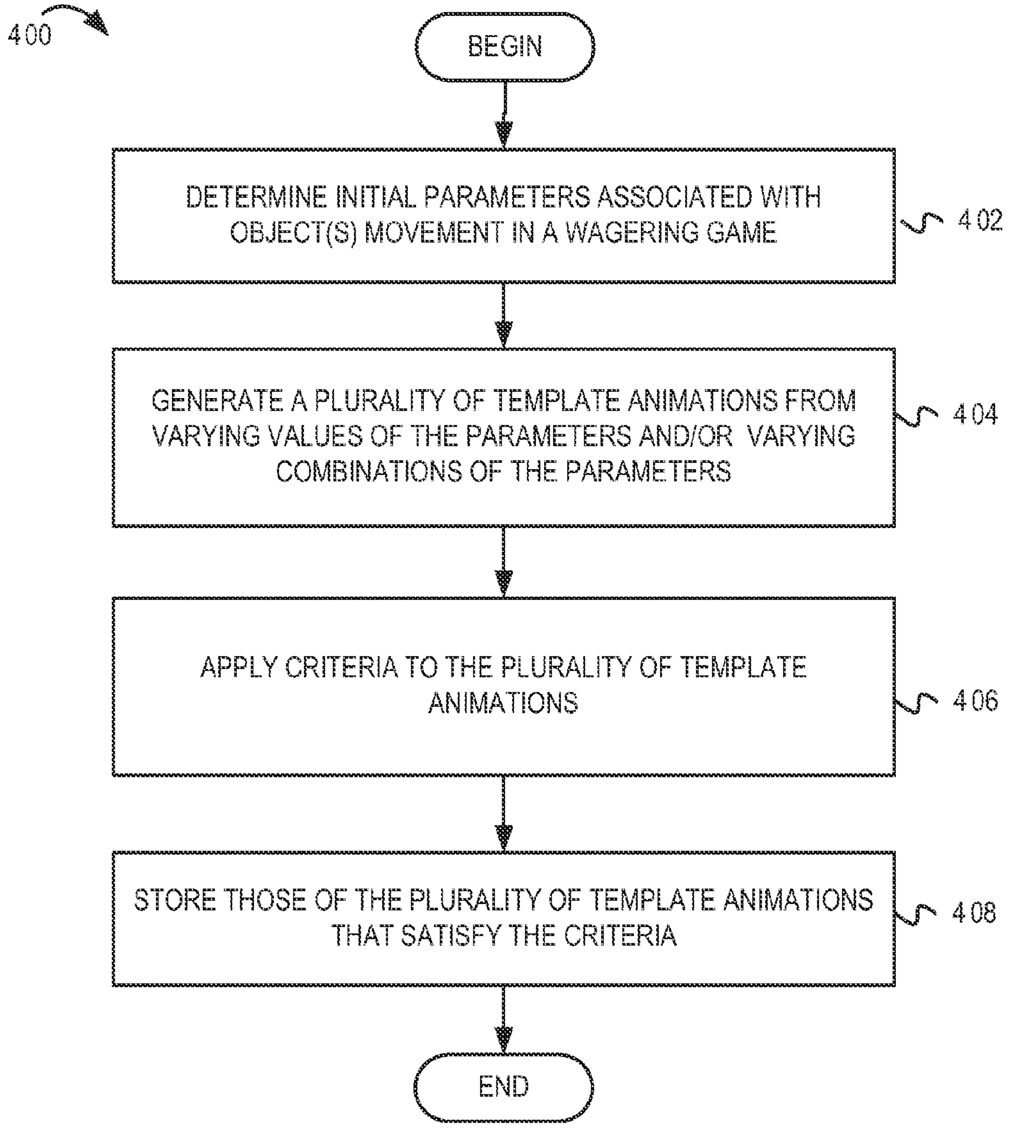
FIG. 4 is a flow diagram illustrating example operations for generating template animations.

FIG. 4 is a flow diagram illustrating example operations for generating template animations. Flow 400 begins at block 402.

At block 402, initial parameters associated with object(s) movement in a wagering game are determined. For instance, initial parameters for a dice throw are determined. The initial parameters can include a direction of the dice throw, whether or not to display a throwing hand, a table, a game board, or other background elements, a number of dice that should be displayed, whether the dice should collide, when and where the dice should collide, how high the dice should be thrown, a speed with which the dice should be thrown, etc. The initial parameters may vary for each dice throw animation and can distinguish one dice throw animation from another so that the player does not get the impression that he/she is watching a prerecorded animation. The flow continues at block 404.

At block 404, a plurality of template animations for the object movement are generated from varying values of the parameters and/or yawing combinations of the parameters. For instance, a simulator can generate several template dice throwing animations by varying a number of model cubes, speed of casting the model cubes, collisions between cubes, etc. The simulator uses models that describe the motion of the dice, interactions between the dice, interactions between the dice and other objects (e.g., a game board) subject to various laws of physics and physical properties of the dice and the other objects. The models can be described by ordinary differential equations, partial differential equations, and other non-linear equations to model the movement of the dice taking into consideration the dynamics and collisions of rigid objects (multiple dice, the game board, etc.). In some implementations, a programmer could chart the motion of the dice. In another implementation, a physics engine within a dynamic simulator can chart the motion of the dice based on gravity, dynamics of rigid objects in three-dimensions (i.e., interactions between dice, interactions between a die and the game board, etc.) subject to the laws of physics (e.g., gravitational laws, momentum, mass, inertia, and other characteristics of the dice), etc. to generate a realistic simulation of the dice throw while constraining movement of the dice based on the initial parameters of the dice throw.

The template dice throwing animation can comprise a sequence of key frames. As described above, the key frames in the dice throw animation define essential points of the dice throw (e.g., interactions between dice, interactions between the dice and the table/game board, a state of the dice before and after the interactions, etc.) to ensure a realistic motion of the dice. The number of key frames that constitute the dice throw animation may be programmable. When the dice throw animation is executed, the dice throw animation transitions between each of the key frames that constitute the dice throw animation. To ensure fluid motion of the dice in the dice throw animation, various interpolation techniques (e.g., spline interpolation) can be implemented to transition from one key frame to a next key frame. In the dice throw animation, dice are represented as dice simulation cubes (e.g., the dice simulation cubes 122 and 124 of FIG. 1) and are substitutes for the dice. Although the dice simulation cubes do not have any values on their faces, the dice simulation cubes have the same physical characteristics as that of actual dice. The dice simulation cubes enable the same dice throw animation to be reused for different outcomes of the dice throw. As described above in FIGS. 1-3, the dice (i.e., the dice with values on the die faces) can be constrained to the dice simulation cubes to generate and present dice throw graphics on a wagering game machine. The flow continues at block 406.

At block 406, criteria are applied to the plurality of template animations. For instance, criteria may require no more than x similar template animations, prohibit template animations with die spinning longer than x seconds, limit template animations to x template animations that differ beyond a threshold, etc. The flow continues at block 408.

At block 408, those of the plurality of template animations that satisfy the criteria are stored. It is noted that the operations of FIG. 4 can be executed to generate and store any suitable number of dice throw animations. From block 408, the flow ends.

It is noted that although FIGS. 1-3 describe the dice being appropriately constrained (e.g., so that appropriate faces of the dice face the players) to the dice throw animation in generate the dice throw graphics and the dice throw graphics being provided to the wagering game machine for presentation, embodiments are not so limited. Any one or more of the operations described with reference to FIG. 1-3 may be performed on either the wagering game machine or a content server. For example, the outcome of the dice throw and the orientation of the dice may be determined by the content server and may be provided to the wagering game machine. A processing unit on the wagering game machine may select a dice throw animation and may determine the initial state of the dice for the selected dice throw animation, the outcome of the dice throw, and the orientation of the dice. The processing unit on the wagering game machine may also constrain the dice to the dice throw animation based on the initial state of the dice and present the dice throw graphics on a display unit of the wagering game machine.

Although FIGS. 1-3 depict the dice throw animation being selected prior to determining the outcome of the dice throw and the orientation of the dice, embodiments are not so limited. In some implementations, the outcome of the dice throw and the orientation of the dice may be selected on receiving the trigger for presenting the dice throw graphics. The dice throw animation may be selected based on the outcome of the dice throw and/or the orientation of the dice. For example, a previous selected dice throw animation may be selected if the outcome of a current dice throw is different from an outcome of a previous dice throw. As another example, the previously selected dice throw animation may not be selected if the outcome of the current dice throw is the same as the outcome of the previous dice throw. It also noted that although FIGS. 1-4 describe traditional 6-sided dice being used as part of the dice throw animation, embodiments are not so limited. In other implementations, the dice can have any suitable number of die faces (e.g., 20 faces, 10 faces, etc). In addition, values for each die face may be represented using dots (as in traditional dice), numbers, colors, images, etc. Furthermore, embodiments are not limited to dice throwing. Embodiments can apply to any of a variety of wagering games that involve motion of objects (e.g., the bouncing ball of a roulette wheel, a coin flip, a ball rolling out of a lottery selection, etc.).

Operating Environment

This section describes an example operating environment and presents structural aspects of some embodiments. This section includes discussion about wagering game networks and wagering game machine architectures.

Wagering Game Networks

Figure 5:
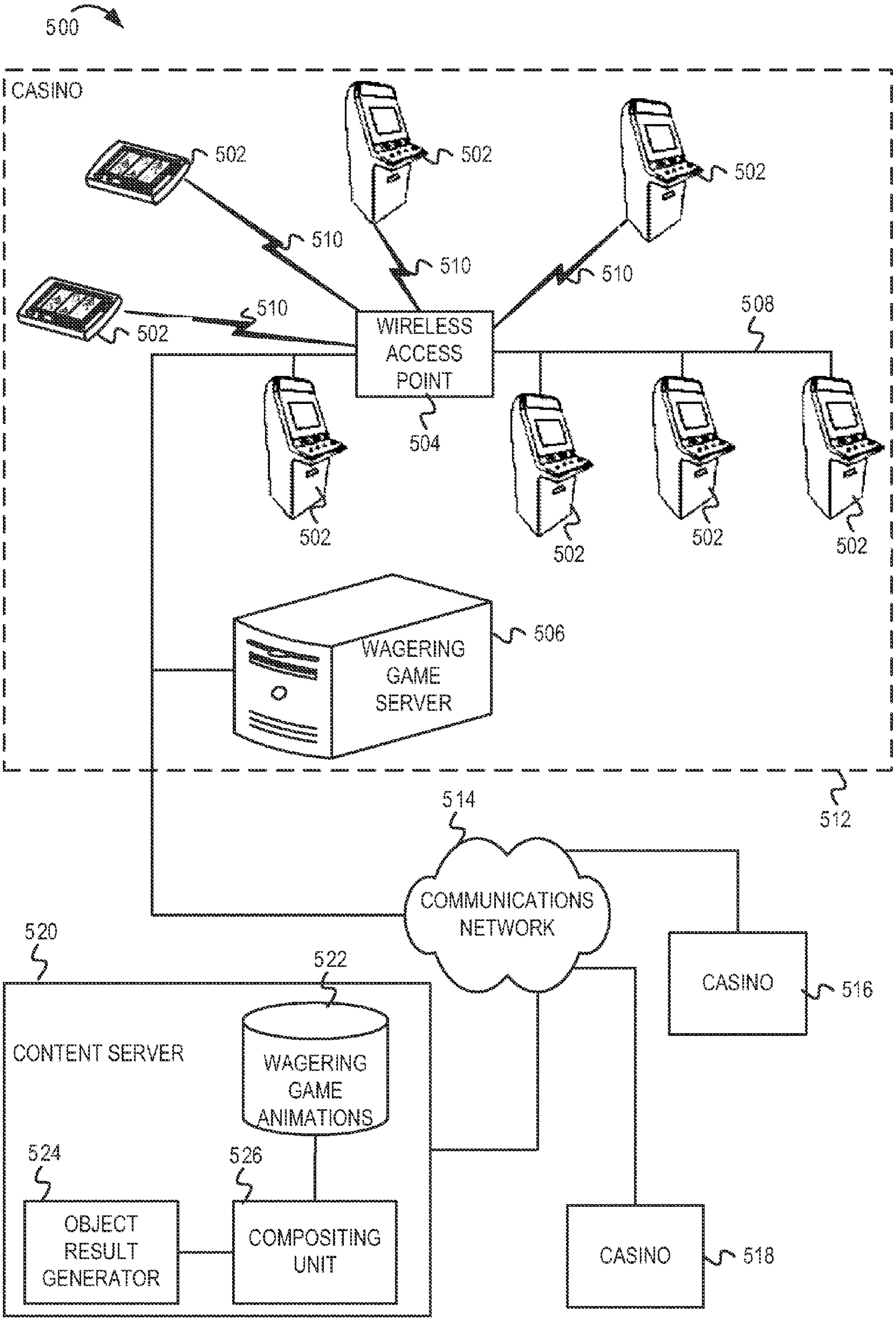
FIG. 5 is a block diagram illustrating a wagering game network, according to example embodiments of the invention.

FIG. 5 is a block diagram illustrating a wagering game network 500, according to example embodiments of the invention. As shown in FIG. 5, the wagering game network 500 includes a plurality of casinos 512, 516, and 518 connected to a communications network 514. Additionally, the plurality of casinos 512, 516, and 518 is also connected to a content server 520 via the communications network 514. object movement result generator 524 object movement result generator 524

Each casino 512 includes a local area network 516, which includes an access point 504, a wagering game server 506, and wagering game machines 502. The access point 504 provides wireless communication links 510 and wired communication links 508. The wired and wireless communication links can employ any suitable connection technology, such as Bluetooth, 802.11, Ethernet, public switched telephone networks, SONET, etc. In some embodiments, the wagering game server 506 can serve wagering games and distribute content to devices located in other casinos 512 or at other locations on the communications network 514.

The content server 520 comprises a wagering game animations database 522, an object movement result generator 524, and a compositing unit 526. The compositing unit 526 is coupled with the object movement result generator 524 and with the wagering game animations database 522. As described with reference to FIGS. 1-3, the compositing unit 526 selects one of multiple pre-generated and stored wagering game animations (e.g., dice throw animations) from the wagering game animations database 522 responsive to a trigger for presenting a wagering game animation. The object movement result generator 524 determines an outcome of a wagering game that involves object movement (e.g., a dice throw) and an orientation of the object(s) to be presented by the wagering game machine 502. While the outcome is randomly determined (e.g., by a random number generator), the orientation of the object(s) may or may not be randomly determined. For example, a pre-determined table indicating the orientation of dice for a given outcome of a dice throw may be accessed. The compositing unit 526 determines, based on the outcome of the dice throw and the orientation of the dice, an initial state of the dice. Me initial state of the dice indicates values on the dice faces that face the player at a first key frame of the selected dice throw animation. The compositing unit 526 also constrains the dice to the dice throw animation based on knowledge of the initial state of the dice to generate the dice throw graphics. The content server 520 then provides the dice throw graphics to the wagering game machine 520. It is noted that in some implementations, the content server 520 may comprise a simulation unit that simulates object movement for wagering games subject to parameters that correspond to the object (e.g., a dice throw subject to dice throw parameters and laws of physics to generate the dice throw animation as described in FIG. 4). In other implementations, the wagering game animations may be generated on another server and may be uploaded to the content server 520.

Embodiments are not limited to implementing functionality of the compositing unit 526 within the content 520. Functionality of the corn unit 526 can also be divided to yawing degrees between the wagering game machine 502 and the content server 520. For instance, the content server 520 can select the dice throw animation and can determine the outcome of the dice throw and the orientation of the dice, while the wagering game machine 502 can determine the initial state of the dice and can appropriately constrain the dice to the dice throw animation to generate the dice throw graphics.

The wagering game machines 502 described herein can take any suitable form, such as floor standing models, handheld mobile units, bartop models, workstation-type console models, etc. Further, the wagering game machines 502 can be primarily dedicated for use in conducting wagering games, or can include non-dedicated devices, such as mobile phones, personal digital assistants, personal computers, etc. In one embodiment, the wagering game network 500 can include other network devices, such as accounting servers, wide area progressive servers, player tracking servers, and/or other devices suitable for use in connection with embodiments of the invention.

In some embodiments, wagering game machines 502 and wagering game servers 506 work together such that a wagering game machine 502 can be operated as a thin, thick, or intermediate client. For example, one or more elements of game play may be controlled by the wagering game machine 502 (client) or the wagering game server 506 (server). Game play elements can include executable game code, lookup tables, configuration files, game outcome, audio or visual representations of the game, game assets, or the like. In a thin-client example, the wagering game server 506 can perform functions such as determining game outcome or managing assets, while the wagering game machine 502 can present a graphical representation of such outcome or asset modification to the user (e.g., player). In a thick-client example, the wagering game machines 502 can determine game outcomes and communicate the outcomes to the wagering game server 506 for recording or managing a player's account.

ID some embodiments, either the wagering game machines 502 (client) or the wagering game server 506 can provide functionality that is not directly related to game play. For example, account transactions and amount rules may be managed centrally (e.g., by the wagering game server 506) or locally (e.g., by the wagering game machine 502). Other functionality not directly related to game play may include power management, presentation of advertising, software or firmware updates, system quality or security checks, etc.

Any of the wagering game network components (e.g., the wagering game machines 502) can include hardware and machine-readable media including instructions for performing the operations described herein.

Wagering Game Machine Architectures

Figure 6:
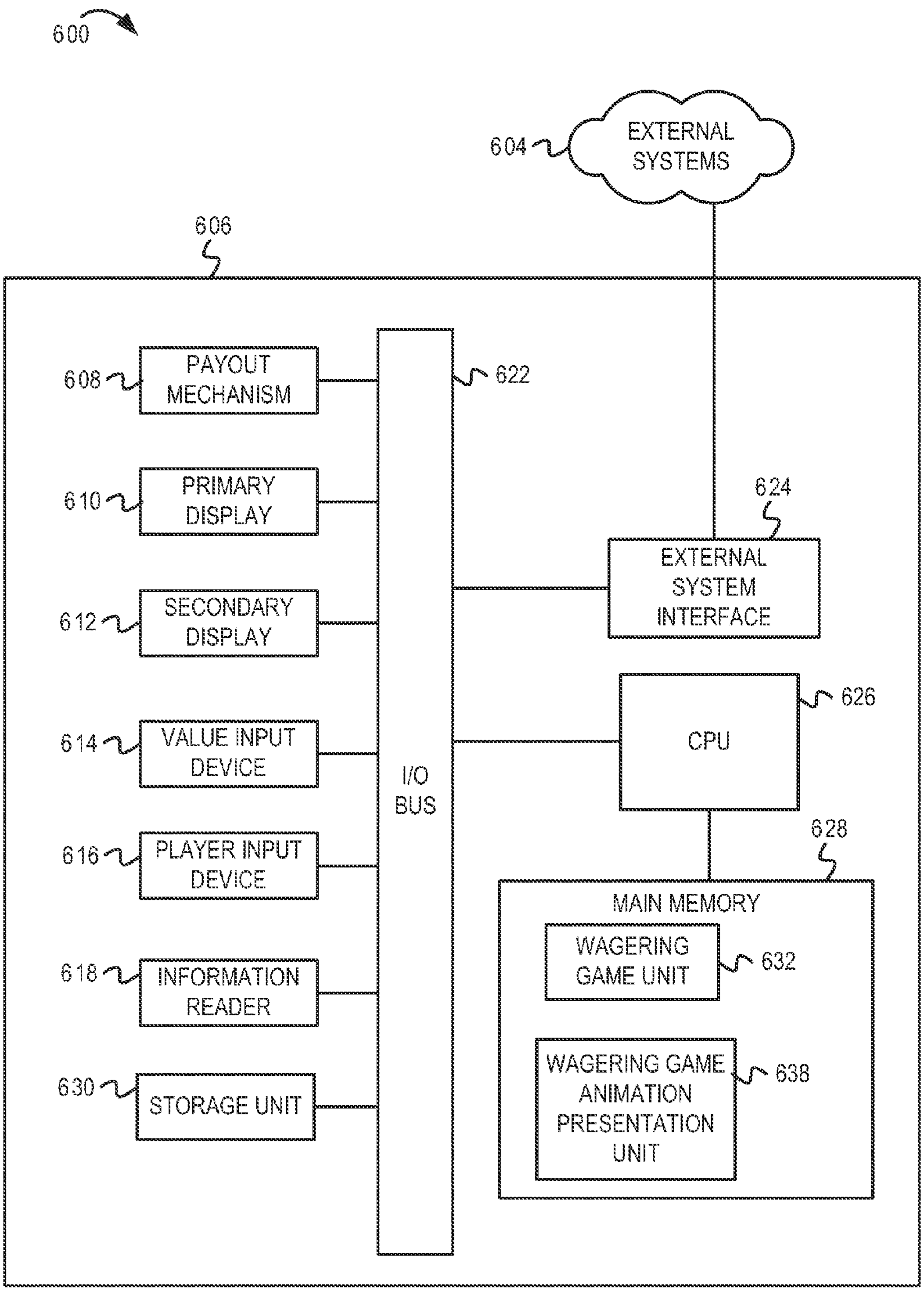
FIG. 6 is a block diagram illustrating a wagering game machine architecture, according to example embodiments of the invention.

FIG. 6 is a block diagram illustrating a wagering game machine architecture 600, according to example embodiments of the invention. As shown in FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or Ultra SPARC processor. The main memory 628 includes a wagering game unit 632 and a wagering game animation presentation unit 638. In one embodiment, the wagering game unit 632 can present wagering games, such as video poker, video black jack, video slots, video lottery, etc., in whole or part.

The wagering game animation presentation unit 638 receives wagering game animations generated by a content server (e.g., the content server 102 of FIG. 1) and presents the wagering game animations on a primary display 610 and/or a secondary display 612 of the wagering game machine 600 in accordance with instructions from a content server. In some implementations, the main memory 628 may also comprise a compositing unit. The compositing unit can receive, from the content server, a template animation, a randomly generated wagering game outcome, and an orientation of an object(s) of the wagering game. As described with reference to FIGS. 1-3, the compositing unit can generate the wagering game animation and present the wagering game animation on the primary display 610 and/or the secondary display 612 of the wagering game machine 600 based on the template animation, the outcome, and the orientation of the object(s).

The CPU 626 is also connected to an input/output (I/O) bus 622, which can include any suitable bus technologies, such as an AGTL+ frontside bus and a PCI backside bus. The I/O bus 622 is connected to a payout mechanism 608, the primary display 610, the secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks).

In one embodiment, the wagering game machine 606 can include additional peripheral devices and/or more than one of each component shown in FIG. 6. For example, in one embodiment, the wagering game machine 606 can include multiple external system interfaces 624 and/or multiple CPUs 626. In one embodiment, any of the components can be integrated or subdivided.

Any component of the architecture 600 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). Machine-readable media can be machine-readable storage media or machine-readable signal media. Examples of machine-readable storage media include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Examples of machine-readable signal media can be in the form of an electro-magnetic signal, an optical signal, or any suitable combination thereof.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

selecting, by one or more processors, a previously generated template animation of a set of one or more graphical objects for a wagering game from a plurality of previously generated template animations, wherein the previously generated template animation simulates movement of the set of one or more graphical objects and wherein the previously generated template animation comprises a sequence of key frames stored on a computer readable storage medium including a beginning key frame and a last key frame;

determining, by the one or more processors, an initial state of the set of one or more objects based, at least in part, on a set of one or more outcome values and on the previously generated template animation, wherein the set of one or more outcome values represent an outcome of the wagering game with respect to the set of one or more objects, wherein determining the initial state includes back computing, at least one of, position and orientation of the set of one or more objects from the last key frame, which corresponds to the set of one or more outcome values, to the beginning key frame;

constraining, by the one or more processors, image data of the set of one or more objects to the previously generated template animation in accordance with the initial state and the set of one or more outcome values to generate a wagering game animation that depicts animation of the set of one or more objects in accordance with the previously generated template animation and the set of one or more outcome values; and providing the wagering game animation for presentation by a wagering game machine.

2. The method of claim 1, wherein the set of one or more outcome values comprises one of a dice throw result, a stopping position of a ball in a roulette wheel, a coin toss result, and stopping positions of a set of lottery balls.

3. The method of claim 1, wherein said constraining the image data of the set of one or more objects to the previously generated template animation in accordance with the initial state and the set of one or more outcome values comprises:

for each of the sequence of key frames of the previously generated template animation, attaching the image data to a current one of the sequence of key frames based, at least in part, on at least one of position and orientation of the current one of the sequence of key frames.

4. The method of claim 3 further comprising determining transitions between the key frames with interpolation.

5. The method of claim 1, wherein the set of one or more objects comprises a set of graphical representations for at least one of a die, a coin, and a ball.

6. The method of claim 1 further comprising determining orientation of the set of objects prior to said determining the initial state of the set of one or more objects, wherein said determining the initial state of the set of one or more objects is also based on the orientation.

7. The method of claim 1, wherein said generating the set of one or more outcome values is responsive to a trigger from the wagering game machine presenting the wagering game.

8. The method of claim 1, wherein said constraining image data of the set of objects to the previously generated template animation comprises one of constraining vertices of the set of objects to vertices of models of the previously generated template animation and constraining vectors of the set of objects to vectors of the models of the previously generated template animation.

9. A method comprising:

generating an outcome for a wagering game that involves at least partially random movement of a set of one or more graphical objects;

selecting a first of a plurality of previously generated template animations based, at least in part, on the wagering game and the set of one or more graphical objects, wherein the first previously generated template animation comprises a sequence of key frames with a set of one or more models that correspond to the set of one or more objects;

determining orientation of the set of one or more objects at an end of the at least partially random movement based, at least in part, on a randomly determined outcome for the wagering game;

determining an initial state of the set of one or more objects in accordance with the first previously generated template animation, the outcome, and the orientation from the end of the at least partially random movement back through the sequence of key frames, wherein determining the initial state includes back computing at least one of position and orientation of the set of one or more objects from a penultimate key frame of the sequence of key frames through one or more intermediate key frames to a first key frame of the sequence of key frames based on at least the orientation of the set of one or more objects at the end of the at least partially random movement; and attaching graphical data of the set of one or more objects to the set of models in accordance with the outcome, the orientation, and the initial state to generate a wagering game animation that depicts the at least partially random movement of the set of one or more objects.

10. The method of claim 9, wherein said determining the orientation of the set of one or more objects at the end of the at least partially random movement based, at least in part, on the outcome comprises randomly determining the orientation as confined by the outcome.

11. A non-transitory machine-readable storage medium encoded with instructions executable by a device to cause the device to:

select a previously generated template animation of a set of one or more graphical objects for a wagering game from a plurality of previously generated template animations, wherein the previously generated template animation simulates movement of the set of one or more graphical objects and wherein the previously generated template animation comprises a sequence of key frames stored on a computer readable storage medium including a beginning key frame and a last key frame;

determine an initial state of the set of one or more objects based, at least in part, on a set of one or more outcome values and on the previously generated template animation, wherein the set of one or more outcome values represent an outcome of the wagering game with respect to the set of one or more objects, wherein determining the initial state includes back computing, at least one of, position and orientation of the set of one or more objects from the last key frame, which corresponds to the set of one or more outcome values, to the beginning key frame;

constrain image data of the set of one or more objects to the previously generated template animation in accordance with the initial state and the set of one or more outcome values to generate a wagering game animation that depicts animation of the set of one or more objects in accordance with the previously generated template animation and the set of one or more outcome values; and provide the wagering game animation for presentation by a wagering game machine.

12. The non-transitory machine-readable storage medium of claim 11, wherein the set of one or more outcome values comprises one of a dice throw result, a stopping position of a ball in a roulette wheel, a coin toss, and a stopping position of a set of lottery balls.

13. The non-transitory machine-readable storage medium of claim 11, wherein the instructions to cause the device to constrain the image data of the set of one or more objects to the previously generated template animation in accordance with the initial state and the set of one or more outcome values comprises the instructions to cause the device to:

for each of the sequence of key frames of the previously generated template animation, attach the image data to a current one of the sequence of key frames in accordance with at least one of position and orientation of the current one of the sequence of key frames.

14. The non-transitory machine-readable storage medium of claim 13, wherein the instructions further cause the device to determine transitions between the key frames with interpolation.

15. The non-transitory machine-readable storage medium of claim 11, wherein the set of one or more objects comprises a set of graphical representations for at least one of a die, a coin, and a ball.

16. The non-transitory machine-readable storage medium of claim 11, wherein the instructions further cause the device to determine orientation of the set of objects prior to the device determining the initial state of the set of one or more objects, wherein the instructions to cause the device to determine the initial state of the set of one or more objects is also based on the orientation.

17. The non-transitory machine-readable storage medium of claim 11, wherein the instructions to cause the device to generate the set of one or more outcome values is responsive to a trigger from a wagering game machine presenting the wagering game.

18. A wagering game system comprising:

memory;

means for selecting a previously generated object movement animation for a wagering game from a plurality of previously generated object movement animations that simulate movement of a set of one or more objects, wherein movement of the set of one or more objects correspond to an outcome for the wagering game and wherein the previously generated object movement animation comprises a sequence of key frames stored on a computer readable storage medium including a beginning key frame and a last key frame;

means for applying graphical representations of the set of one or more objects to the previously generation object movement animation for the wagering game in accordance with a randomly generated outcome for the wagering game; and means for determining an initial state of the set of one or more objects based, at least in part, on the randomly generated outcome, wherein determining the initial state includes back computing, at least one of, position and orientation of the set of one or more objects from the last key frame, which corresponds to the outcome, through one or more intermediate key frames to the beginning key frame.

19. An apparatus comprising:

a processor;

network interface; and a wagering game animation presentation unit operable to, select a previously generated template animation of a set of one or more graphical objects for a wagering game from a plurality of previously generated template animations, wherein the previously generated template animation simulates movement of the set of one or more graphical objects and wherein the previously generated template animation comprises a sequence of key frames stored on a computer readable storage medium including a beginning key frame and a last key frame;

determine an initial state of the set of one or more objects based, at least in part, on a set of one or more outcome values and on the previously generated template animation, wherein the set of one or more outcome values represent an outcome of the wagering game with respect to the set of one or more objects, wherein determination of the initial state includes back computing, at least one of, position and orientation of the set of one or more objects from the last key frame, which corresponds to the set of one or more outcome values, to the beginning key frame;

constrain image data of the set of one or more objects to the previously generated template animation in accordance with the initial state and the set of one or more outcome values to generate a wagering game animation that depicts animation of the set of one or more objects in accordance with the previously generated template animation and the set of one or more outcome values; and provide the wagering game animation for presentation by a wagering game machine.

20. The apparatus of claim 19, wherein the wagering game animation presentation unit being operable to constrain the image data of the set of one or more objects to the previously generated template animation in accordance with the initial state and the set of one or more outcome values comprises the wagering game animation presentation unit being operable to:

for each of the sequence of key frames of the previously generated template animation, attach the image data to a current one of the sequence of key frames in accordance with at least one of a position and an orientation of the current one of the sequence of key frames, wherein the previously generated template animation comprises the sequence of key frames.

21. The apparatus of claim 19, wherein the wagering game animation presentation unit is operable to determine orientation of the set of objects prior to determining the initial state of the set of one or more objects, wherein the apparatus determines the initial state of the set of one or more objects also based on the orientation.

* * * * *